United States Patent Office 3,663,592
Patented May 16, 1972

3,663,592
FLUOROALKOXYALKYL 2-CYANOACETATES
Elden H. Banitt, Woodbury Village, Minn., assignor to Minnesota Mining and Manufacturing Company, St. Paul, Minn.
No Drawing. Continuation-in-part of application Ser. No. 734,195, June 4, 1968. This application Dec. 2, 1969, Ser. No. 881,584
Int. Cl. C07c *121/16*
U.S. Cl. 260—465.4
6 Claims

ABSTRACT OF THE DISCLOSURE

Fluorinated alkoxyalkyl 2-cyanoacetates having the formula

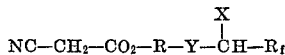

wherein R is a straight or branched, divalent, aliphatic hydrocarbon radical having from 2 to 8 carbon atoms; $R_f$ is a straight or branched fluoroaliphatic radical having from 1 to 5 carbon atoms, Y is O or S and X is H, lower alkyl or lower fluoroaliphatic have been found to be useful intermediates in synthesizing cyanoacrylates which are useful adhesives. When the latter are applied as monomers to adherends, they polymerize rapidly in the presence of even small amounts of, e.g., moisture, to form strong bonds.

---

This application is a continuation-in-part of application Ser. No. 734,195 filed June 4, 1968, now U.S. Pat. 3,532,674.

This invention relates to novel fluoroalkoxyalkyl 2-cyanoacetates which are valuable intermediates.

As far as is known, fluoroalkoxyalkyl 2-cyanoacetates have not previously been known.

It is an object of the present invention to provide fluoroalkoxyalkyl 2-cyanoacetates.

The class of 2-cyanoacetate esters which comprise this invention is represented by the structural formula:

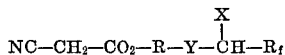

wherein R is a straight or branched, divalent, aliphatic hydrocarbon radical having from 2 to 8 carbon atoms, e.g., ethylene, propylene, trimethylene, 1,2-butylene, 2,3-butylene, tetramethylene and the like; $R_f$ is straight or branched fluoroaliphatic radical having from 1 to 5 carbon atoms; Y is O or S and X is H, lower alkyl or lower fluoroaliphatic. The term "fluoroaliphatic radical" is herein defined to include straight or branched chain alkyl radicals containing as substituents at least one fluorine atom per carbon atom, and if chlorine is present a ratio of no more than one chlorine atom per carbon atom. Lower alkyl and lower perfluoroaliphatic include up to about 5 carbon atoms.

Illustrative compounds of the invention include:

2-(2,2,2-trifluoroethoxy)ethyl cyanoacetate
2-(2,2,2-trifluoroethylthio)ethyl cyanoacetate
2-(1,1,3-trihydroperfluoro-n-propoxy)ethyl cyanoacetate
2-(1-trifluoromethyl-2,2,2-trifluoroethoxy)ethyl cyanoacetate
2-(1,1-dihydroperfluoro-n-butoxy)ethyl cyanoacetate
2-(1-trifluoromethylethoxy)ethyl cyanoacetate
1-methyl-2-(2,2,2-trifluoroethoxy)ethyl cyanoacetate
2-(1-chlorodifluoromethyl-2,2-difluoro-2-chloroethoxy)ethyl cyanoacetate The compounds of the invention are prepared by reaction of 2-cyanoacetyl chloride with a suitable fluoroalcohol. Such alcohols are known in the art or may be prepared by well-known methods, such as the base catalyzed reaction of a fluorine-containing alcohol with an epoxide and the displacement reaction by a fluorine-containing alkoxide with a halo-alcohol wherein the halo atom is chloro, bromo or iodo.

Generally, esterification procedures such as those used to prepare the compounds of the present invention are well known to those skilled in the art, and the procedures will be apparent from the present disclosure.

The compounds of the invention are useful to prepare fluorinated 2-cyanoacrylate polymers which are depolymerized to provide cyanoacrylate monomers.

The method of preparing high purity (95 percent or greater) fluoroalkoxyalkyl 2-cyanoacrylates comprises catalyzing the condensation of formaldehyde with the corresponding esters of cyanoacetic acid of the invention by means of a mixture of an acid and the acid salt of an alkyl primary or secondary amine as more fully described in the parent application. The cyanoacetate is reacted with formaldehyde or polymers thereof, such as paraformaldehyde. Aqueous solutions of formaldehyde as typified by Formalin are not useful, however. The reaction medium may be any suitable inert organic solvent capable of forming an azeotrope with water.

Both primary or secondary amine salt and free acid are always present. Glacial acetic or strong mineral acids such as hydrochloric acid or sulfuric acid are preferred. The amount of catalyst employed is not critical and may be varied. Ordinarily a small amount, e.g., 0.5 to 1.0 percent by weight, based on the weight of cyanoacetic ester, is adequate.

Other than employing the amine acid salt and free acid, the condensation of cyanoacetic esters with formaldehyde and the subsequent depolymerization process are carried out by methods similar to prior art methods.

Esters of cyanoacetic acid of the invention may be prepared by direct esterification of cyanoacetic acid in the presence of an acid catalyst, such as sulfuric acid or the like with alcohols represented by the formula:

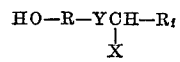

in which R, $R_f$, Y and X have the values assigned above. These alcohols are known to the art, or may be prepared by well-known methods such as the base-catalyzed reaction of a fluorine-containing alcohol with an epoxide, and the displacement reaction of a fluorine-containing alkoxide with a halo-alcohol wherein the halo atom is chloro, bromo or iodo.

The following examples illustrate the best mode contemplated of practicing the invention. It will be understood, however, that these examples are included merely for the purposes of illustration and are not intended to limit the scope of the invention. All parts are by weight unless otherwise specified, and the pressures are shown in millimeters of mercury.

EXAMPLE 1

This example illustrates the preparation of 2-(2,2,2-trifluoroethoxy)ethanol an alkanol for use in forming esters of the invention.

Method A: A concentrated solution of potassium 2,2,2-trifluoroethoxide is prepared by heating 61.8 g. of potassium hydroxide (1.1 mole) in 150 g. of 2,2,2-trifluoroethanol (1.5 moles) to 90° C. for one hour. 80.5 g. of 2-chloroethanol (1.0 mole) is then added dropwise with good stirring over 3.5 hours at 90° C. The thick, brown mixture is filtered to remove salt, concentrated under vacuum and crudely distilled. Redistillation through the spinning band column provides purified product alcohol, B.P. 84° C./70 mm.; $n_D^{27°} = 1.3545$.

*Analysis.*—Calculated for $C_4H_7F_3O_2$ (percent): C, 33.3; H, 4.9. Found (percent): C, 32.9; H, 4.8.

Method B: Into a 1 liter round-bottomed flask equipped with mechanical stirrer and two Dry Ice condensers are placed 340 g. of 2,2,2-trifluoroethanol (3.4 moles), 3.4 g. of sodium hydroxide and 3.4 ml. of water. The mixture is heated to 70° C. and stirred. About 100 g. of ethylene oxide (2.27 moles) is introduced as a gas into the top of one of the condensers over a period of 3.5 hours and allowed to condense into the reaction mixture. The mixture is stirred at 70° C. for an additional four hours and distilled through a glass helices-packed column. Excess 2,2,2-trifluoroethanol is recovered together with a fraction boiling at 71–81° C./36–85 mm., composed of 91 percent product alcohol and 9 percent 2,2,2-trifluoroethanol.

The following precursor fluoroalkoxy alcohols are prepared by the general procedures described in Methods A or B above when the starting materials are reacted.

EXAMPLE 3

A solution of 170.2 g. of cyanoacetic acid (2.0 moles), 0.5 ml. of concentrated sulfuric acid and 2.1 moles of 2-(1-trifluoromethyl-2,2,2-trifluoroethoxy)ethanol in 400 ml. of benzene is heated under reflux. When no more water separates, the benzene solution is cooled, washed with water, then with 5 percent sodium bicarbonate solution and dried over sodium sulfate. Filtration, removal of benzene under reduced pressure and fractional distillation yields 2-(1-trifluoromethyl - 2,2,2 - trifluoroethoxy)ethyl cyanoacetate, B.P. 91–94° C./0.05 mm.

EXAMPLE 4

The procedure of Example 3 is followed using 2.1 moles of 2-(2,2,3,3-tetrafluoropropoxy)ethanol in place of

| Starting materials | | |
|---|---|---|
| Fluorinated alcohol | Epoxide or haloalcohol | Product |
| $CH_3-CH(OH)-CF_3$ | $CH_2CHCH_3$ (epoxide) | $HOCHCH_2OCHCF_3$ with $CH_3$ and $CH_3$ |
| $Cl(CF_2CFCl)_2CF_2CH_2OH$ | $CH_2-CH_2$ (epoxide) | $HO(CH_2)_2OCH_2CF_2(CFClCF_2)_2Cl$ |
| $H(CF_2)_4CH_2OH$ | $Br(CH_2)_4CHCH_3$ with $OH$ | $HOCH(CH_2)_4OCH_2(CF_2)_4H$ with $CH_3$ |
| $CF_3(CF_2)_2CH_2OH$ | $Br(CH_2)_3OH$ | $HO(CH_2)_3OCH_2(CF_2)_2CF_3$ |
| $CF_3CF_2CHCH_2CH_3$ with $OH$ | $CH_2-CH_2$ (epoxide) | $HO(CH_2)_2OCH(CH_2CH_3)(CF_2CF_3)$ |
| $CF_3(CF_2)_2CHCF_2CF_3$ with $OH$ | $CH_2-CH_2$ (epoxide) | $HO(CH_2)_2OCH(CF_2CF_3)((CF_2)_2CF_3)$ |
| $H(CF_2)_2(CH_2)_3OH$ | $BrCH_2CH_2OH$ | $HO(CH_2)_2O(CH_2)_3CF_2CF_2H$ |

EXAMPLE 2

This example illustrates procedures for preparing esters of the invention.

2-(2,2,2-trifluoroethoxy)ethyl cyanoacetate

Method A: Crude cyanoacetyl chloride prepared from 51.0 g. of cyanoacetic acid (0.6 mole) and 125.0 g. of phosphorus pentachloride (0.6 mole) is treated with 93 g. of 2-(2,2,2-trifluoroethoxy)ethanol (0.645 mole) introduced in increments over a period of one hour to avoid overheating. The reaction is thereafter forced to completion by heating to 65° C. for two hours. Crude product boiling at 102–108° C./0.1 mm. is distilled directly from the reaction vessel and redistilled through a spinning band column, B.P. 85–86° C./0.1 mm.

*Analysis.*—Calculated for $C_7H_8F_3NO_3$ (percent): C, 39.8; H, 3.8. Found: (percent): C, 39.5; H, 3.8.

Method B: 85.1 g. of cyanoacetic acid (1.0 mole) is esterified with 192.5 g. of 2-(2,2,2-trifluoroethoxy)ethanol (1.25 moles) by heating a mixture of the two reagents in 300 ml. of benzene containing 0.25 g. of p-toluene-sulfonic acid. When no more water separates in a Dean-Stark trap, the benzene solution is cooled, filtered and concentrated under vacuum. Distillation of the residue provides the corresponding cyanoacetate, B.P. 98–102° C./0.1–0.2 mm. The infrared spectrum is identical to that of the material obtained in Method A.

2-(1-trifluoromethyl-2,2,2 - trifluoroethoxy)ethanol. The product, 2-(2,2,3,3-tetrafluoropropoxy)ethyl cyanoacetate, boils at 110–111° C./0.5 mm.

EXAMPLE 5

2-(1,1-dihydroperfluorobutoxy)ethanol

This example illustrates the alternative method for the preparation of a fluoroalkoxyalkylalcohol. This novel alcohol is reacted further in Example 6 to prepare a compound of the present invention.

A mixture of 200 g. (1.0 mole) 1,1-dihydroperfluorobutanol, 2.0 g. sodium hydroxide and 2 ml. water is placed in a 500 ml. round-bottomed flask equipped with internal thermometer, magnetic stirrer and two Dry Ice condensers. The mixture is stirred and maintained at 50° C. while 35.8 g. (0.8 mole) ethylene oxide is introduced as a gas into the top of one condenser over a period of 1.5 hours. After completion of the addition, the solution is heated under reflux conditions for 4 hours and distilled through a short column. Excess 1,1-dihydroperfluorobutanol is recovered together with a fraction boiling at 80–98° C./85–95 mm. It is composed of 90% product alcohol and 10% starting alcohol and can be used in the subsequent esterification without further purification.

EXAMPLE 6

2-(1,1-dihydroperfluorobutoxy)ethyl 2-cyanoacetate

Cyanoacetic acid (51.1 g., 0.60 mole) is esterified with 119.7 g. (0.81 mole) 2 - (1,1-dihydroperfluorobutoxy)- ethanol by heating the two reagents in 300 ml. benzene containing 0.5 g. p-toluene sulfonic acid. When no more water separates in a Dean-Stark trap, the benzene solution is cooled, filtered and concentrated. Distillation of the residue provides the cyanoacetate, B.P. 91–92° C./0.4 mm.

Some representative compounds which are prepared by the method of above examples are listed in the following table.

TABLE

Fluorine-containing cyanoacetates, $NC-CH_2CO_2Q$

| Example No.: | Q | B.P. (° C. mm. Hg) |
|---|---|---|
| 7 | $-CH_2CH_2SCH_2CF_2$ | 90–92/0.15 |
| 8 | $-CH_2CH_2OCH_2(CF_2)_2H$ | 110–111/0.15 |
| 9 | $-CH_2CH_2OCH(CF_3)_2$ | 91–94/0.05 |
| 10 | 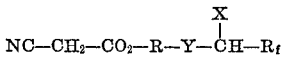 | 103–104/0.6 |
| 11 | $-CHCH_2OCH_2CF_3$<br>$\quad\mid$<br>$\quad CH_3$ | 91–92/0.55 |

EXAMPLE 12

This example illustrates how the esters of the invention are used. 2-(2,2,2-trifluoroethoxy)ethyl-2-cyanoacrylate. A mixture of 422.4 g. of 2-(2,2,2-trifluoroethoxy)ethyl cyanoacetate (2.0 moles), 78 g. of powdered paraformaldehyde (2.6 moles), 2.5 g. of piperidine hydrochloride and 1 ml. of glacial acetic acid in 800 ml. of benzene is heated under reflux until no further water separates. The resulting solution is diluted with 400 ml. of acetone, filtered, combined with 210 g. of tricresylphosphate and concentrated by distillation at reduced pressure. 10 g. of polyphosphoric acid and 0.5 g. of pyrogallol are added to the viscous residue, and depolymerization is effected by heating this mixture under reduced pressure using a good sulfur dioxide bleed into the reaction vessel and rapid mechanical stirring. Crude monomer weighing 310 g. is collected in a Dry Ice-cooled receiver at a bath temperature/system pressure of 185–195° C./0.15 mm. Redistillation from a small amount of phosphorus pentoxide in the presence of sulfur dioxide provides +99 percent pure monomeric product.

What is claimed is:

1. A fluoroaliphatic cyanoacetate represented by the formula $$NC-CH_2-CO_2-R-Y-\underset{\underset{X}{|}}{C}H-R_f$$

wherein R is straight or branched, divalent, unsubstituted alklyene hydrocarbon radical having from 2 to 8 carbon atoms, $R_f$ is straight or branched chain lower fluoroalkyl radical containing from 1 to 5 carbon atoms, Y is oxygen or sulfur and X is $R_f$, H, or lower alkyl and $R_f$ is as above defined.

2. Fluoroaliphatic cyanoacetate according to claim 1 wherein R is $C_2H_4$, X is H, Y is oxygen and $R_f$ is $CF_3$.

3. Fluoroaliphatic cyanoacetate according to claim 1 wherein R is $C_2H_4$, X is H, Y is oxygen and $R_f$ is $C_2F_5$.

4. Fluoroaliphatic cyanoacetate according to claim 1 wherein R is $C_2H_4$, X is H, Y is oxygen and $R_f$ is $C_3F_7$.

5. Fluoroaliphatic cyanoacetate according to claim 1 wherein R is $C_2H_4$, X is H, Y is sulfur and $R_f$ is $CF_3$.

6. Fluoroaliphatic cyanoacetate according to claim 1 wherein R is $C_2H_4$, X is H, Y is oxygen and $R_f$ is $(CF_2)_2H$.

References Cited

UNITED STATES PATENTS

| 2,817,678 | 12/1957 | Barnhart | 260—465.4 XR |
| 2,985,682 | 5/1961 | Raffelson | 260—465.4 XR |
| 3,532,674 | 10/1970 | Banitt | 260—465.4 XR |

JOSEPH P. BRUST, Primary Examiner

U.S. Cl. X.R.

260—78.4, 609, 615